Dec. 12, 1939.   K. GÄBLER   2,183,256
PHOTOELECTRIC CELL
Filed July 21, 1937
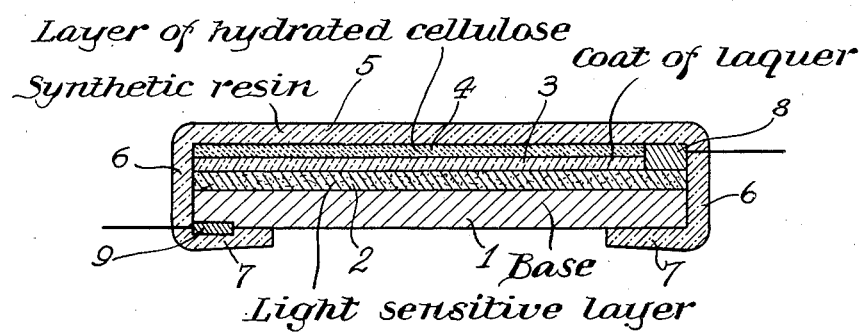
INVENTOR.
Kurt Gäbler
BY  B. Singer
his ATTORNEY.

Patented Dec. 12, 1939

2,183,256

UNITED STATES PATENT OFFICE 2,183,256

PHOTOELECTRIC CELL

Kurt Gäbler, Dresden, Germany, assignor to Zeiss Ikon Aktiengesellschaft, Dresden, Germany Application July 21, 1937, Serial No. 154,725
In Germany November 30, 1936

2 Claims. (Cl. 136—89)

The invention relates to improvements in photoelectric cells, and particularly pertains to photoelectric cells employed in exposure meters.

Photoelectric cells, for instance cuprous oxide or selenium cells change their sensitiveness when subjected to atmospheric influences. It is therefore necessary, especially in tropical climates, to protect the photoelectric cell against adverse atmospheric conditions, in order to prevent faulty measurements of the exposure time when using a photoelectric exposure meter. It is customary, to apply a coat of lacquer to the surface of the photoelectric cell, but for tropical climates such coat of lacquer does not afford sufficient protection.

It is not the principal object of the invention to provide a photoelectric cell with means constituting a sufficient and durable protection against adverse climatical condition encountered especially in the tropics.

I am aware of the fact, that it has been proposed heretofore to protect photoelectric cells whose surface is provided with a lacquer coating by an additional coating which is vapor and moistureproof and which consists of a thin foil of some suitable material as for instance some synthetic resins. Such additional coating, however, has proven not very satisfactory, because the sensitiveness of the photoelectric cell was unfavorably influenced thereby. It appears that this undesirable condition is due to the fact that such foils merge into the lacquer coating on the surface of the cell. As the lacquer layer has another coefficient of expansion than the foil a decreasing or increasing of temperature will produce internal stresses and hereby damage the photoelectric layer.

It is therefore another object of the invention to provide the photoelectric cell which has a lacquer coating with a protective layer which will not influence the sensitiveness of the cell and which will not combine or will not merge appreciably with the said surface coating of the photoelectric cell. Thereupon a layer which forms the real protection against detrimental atmospheric influences is applied on top of this intermediate or auxiliary protective layer.

The drawing shows by way of example a cross-sectional view of a photoelectric cell of the present invention greatly magnified.

The photoelectric cell consists of a base member 1 upon which the light sensitive layer 2 consisting for example of cuprous oxide or selenium is arranged. A coat 3 of lacquer is applied to the outer surface of the light sensitive layer 2 and then an intermediate protective layer 4 is arranged upon the lacquer coating 3. The lacquer may consist of a styrol product which as is well known is very adhesive.

The intermediate protective layer 4 consists preferably of hydrated cellulose of a type which does not readily combine with the lacquer coating 3. Such types of hydrated cellulose are for example Cellophane.

Upon the intermediate layer 4 is then applied a cover layer 5 which preferably extends around the edges of the photoelectric cell as indicated at 6 and then is folded at 7 inwardly against the bottom surface of the base member 1. The cover layer 5 consists preferably a synthetic resin, for example a foil consisting of resin of plexicum (a derivative from acrylic acid).

The conductor terminals 8 and 9 are applied to the cell in customary manner.

Obviously, the lacquer coating 3, the intermediate layer 4 and the cover layer 5 have to be transparent to admit adequately the light rays to the light sensitive layer 2.

What I claim as my invention is:

1. A photoelectric cell comprising a base member provided with a light sensitive layer having applied on its outer surface a coating of lacquer, and means for protecting said light sensitive layer against tropical atmospheric conditions, said means consisting of a layer of hydrated cellulose arranged on top of said lacquer coating and a cover layer of transparent synthetic resin applied on top of said cellulose layer, said synthetic resin layer extending around the edges of the superimposed assembly of said base member, light sensitive layer, lacquer coating and cellulose layer.

2. A photoelectric cell comprising a base member provided with a light sensitive layer having applied on its outer surface a coating of lacquer, and means for protecting said light sensitive layer against tropical atmospheric conditions, said means consisting of a layer of hydrated cellulose arranged on top of said lacquer coating and a cover layer of transparent synthetic resin applied on top of said cellulose layer, said synthetic resin layer extending around the edges of the superimposed assembly of said base member, light sensitive layer, lacquer coating and cellulose layer, and being folded with its marginal portion against the underside of said base member.

KURT GÄBLER.